(12) United States Patent
Ivie

(10) Patent No.: US 6,394,379 B1
(45) Date of Patent: May 28, 2002

(54) SPINNING REEL WITH UNIFORM VELOCITY SPOOL

(75) Inventor: Cameron Ivie, Arnolds Park, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 09/571,855

(22) Filed: May 16, 2000

(51) Int. Cl.[7] .............................................. A01K 89/01
(52) U.S. Cl. .......................................... 242/242; 74/55
(58) Field of Search ................................ 242/241, 242; 74/55, 567, 569

(56) References Cited

U.S. PATENT DOCUMENTS

| | | | | |
|---|---|---|---|---|
| 1,379,846 A | * | 5/1921 | Benson | 74/55 |
| 2,528,386 A | * | 10/1950 | Napper | 74/55 |
| 3,367,597 A | * | 2/1968 | Morritt | 242/242 |
| 4,927,094 A | | 5/1990 | Henriksson | 242/242 |
| 5,176,336 A | | 1/1993 | Kaneko | 242/264 |
| 5,513,814 A | * | 5/1996 | Zanon | 242/241 |
| 5,575,431 A | | 11/1996 | Henriksson | 242/241 |
| 5,605,299 A | | 2/1997 | Henriksson | 242/247 |
| 5,921,489 A | * | 7/1999 | Shibata | 242/242 |
| 6,000,653 A | | 12/1999 | Okada | 242/242 |

FOREIGN PATENT DOCUMENTS

CA 0678728 * 1/1964 ................ 242/241

* cited by examiner

*Primary Examiner*—Katherine A. Matecki
(74) *Attorney, Agent, or Firm*—Roylance, Abrams, Berdo & Goodman LLP

(57) ABSTRACT

A fishing reel includes an oscillating main shaft, a spool attached to the main shaft through a drag assembly and a rotor for winding fishing line onto the spool. The fishing reel includes an oscillating assembly including a rotating oscillating member having a cam that slides along a camming surface in a slider coupled to the main shaft. The recessed area of the slider has a first cam surface with a substantially figure-8 configuration and a second cam surface spaced from the first cam surface. The cam assembly coupled to the oscillating member has a first cam member that contacts the camming surface of the first recessed area and a second cam member contacting the camming surface of the second recess to produce an axial movement of the slider at a substantially uniform speed throughout rotation of the oscillating member. The cam assembly provides a constant ratio between the oscillating speed of the main shaft and the winding speed of the rotor.

35 Claims, 7 Drawing Sheets

SPINNING REEL WITH UNIFORM VELOCITY SPOOL

FIELD OF THE INVENTION

The present invention is directed to a fishing reel having a spool and a rotor for winding a fishing line onto the spool. More particularly, the invention is directed to a fishing reel having an oscillating spool that oscillates at a substantially uniform velocity throughout the stroke of the spool while the rotor winds the fishing line onto the spool.

BACKGROUND OF THE INVENTION

Open face fishing reels are well known in the art. This type of fishing reel typically has a main shaft mounted within a housing and a fishing line spool attached to the end of the main shaft. The end of the main shaft opposite the fishing line spool has a drive assembly for reciprocating the main shaft and the spool in an axial direction while a rotor revolves around the spool to wind the fishing line onto the spool. Generally, the drive member has a straight slot that receives a pin mounted in a rotating oscillating gear. The oscillating gear is rotated by turning a handle or crank. An example of this type of fishing reel is disclosed in U.S. Pat. No. 5,605,299 to Henriksson.

Another type of fishing reel includes a main shaft having a spool mounted at one end of the main shaft where the main shaft is rotatably and axially displaceable in a housing. A driving gear is also mounted in the housing and meshes with an oscillating gear. The oscillating gear is operatively coupled to the main shaft for oscillating the main shaft and spool in an axial direction.

These devices typically oscillate the spool in an axial direction while the fishing line is wound onto the spool. The oscillating gear includes a cam surface connected to an oscillating slider for imparting the axial motion to the spool while the line is being retrieved. The slot in the oscillation slider is generally either a straight slot or an S-shaped slot. A straight slot in the oscillation slider of most reels produces an axial motion that moves at a non-uniform speed. The axial motion produced by the slider results in a decrease in the speed of the main shaft towards the end of each stroke. Thus, as the cam approaches the end of the slot, the speed of the slider decreases and then increases as the cam moves away from the end of slot. Since the rotation of the rotor and the winding of the fishing line onto the spool is constant, the distribution of the fishing line on the spool is uneven. The decrease in speed of the main shaft and spool result in an increase of the fishing line building up at each end of the spool. The uneven winding of the fishing line on the spool results in a decrease in casting distance and increases the occurrence of wind knots. In addition, a non-uniform distribution of the fishing line on the spool can decrease the efficiency and smoothness of the drag function of the reel.

Various efforts have been made to produce a fishing reel that winds the fishing line onto a spool at a uniform rate. One example is disclosed in U.S. Pat. No. 6,000,653 to Okada. This patent discloses a fishing reel comprising a reel body, a rotating frame and a spool shaft that is movable along the axis of rotation of the rotating frame. An oscillating gear is provided in the reel body to oscillate the main shaft in a manner to apply the line uniformly on the spool. The rotational member includes a first projection engaging a cam groove formed on an inner surface of the reel body. A second projection engages the oscillator to control the speed of the oscillator. This results in the main shaft oscillating at a speed in relation to the rotor to wind the fishing line in a more uniform manner onto the spool.

The above-noted fishing reels are generally effective for their intended purpose but are difficult to assemble, expensive to manufacture and require large amounts of space in the housing. Accordingly, there is a continuing need in the industry for an improved fishing reel that is able to wind a fishing line uniformly onto a spool.

SUMMARY OF THE INVENTION

The present invention is directed to a fishing reel having a non-rotating spool that oscillates in an axial direction as a fishing line is wound onto the spool. More particularly, the invention is directed to a fishing reel having a drive assembly that oscillates the spool axially with respect to a housing to wind the fishing line uniformly onto the spool.

Accordingly, a primary object of the invention is to provide a fishing reel having an oscillating spool where the spool oscillates along an axis at a substantially constant velocity with respect to winding speed of a fishing line onto the spool.

Another object of the invention is to provide a fishing reel having an oscillating spool that is able to wind the fishing line onto the spool without buildup of line at the end of each stroke of the oscillating spool.

Still another object of the invention is to provide a fishing reel including an oscillating spool and a rotor for winding fishing line onto the spool, where the spool and the rotor are operatively coupled together so that the spool oscillates about its axis at a velocity proportional to a rotational velocity of the rotor.

A further object of the invention is to provide a fishing reel that is able to wind a fishing line uniformly onto a spool to improve casting ability of the fishing reel.

Still another object of the invention is to provide a fishing reel having an oscillating spool that is able to wind the fishing line onto the spool with a decreased incidence of winding knots.

Another object of the invention is to provide a fishing reel having a spool mounted on an oscillating main shaft where the main shaft includes a slider having a figure-8 shaped slot for engaging a cam member.

A further object of the invention is to provide a fishing reel having a spool coupled to an oscillating slider where the slider includes two cooperating cam surfaces for oscillating the slider at a substantially uniform velocity.

Another object of the invention is to providing a fishing reel having an oscillating member with a cam member operatively connected to a slider having a substantially figure-8 shaped slot for oscillating a spool at a substantially uniform speed along an axis while winding a fishing line onto the spool.

Still another object of the invention is to provide a fishing reel having a rotatable oscillating member having two cam members engaging an oscillating slider to oscillate a spool along an axis at a substantially constant speed with respect to a rotational velocity of the oscillating member.

Another object of the invention is to provide a fishing reel having a spool coupled to a main shaft having an oscillating slider where the slider includes a figure-8 shaped recess receiving a cam member where the cam member maintains substantially continuous contact with the surface of the recess in the slider.

The foregoing objects and advantages of the invention are basically attained by providing a fishing reel comprising a housing having a forward end and back end and a main shaft mounted in the housing. The main shaft has a first axial end and second axial end. A line spool is coupled to the first end of the main shaft for receiving a fishing line. The main shaft is non-rotatable with respect to the housing. A rotor assembly is rotatably mounted in the housing and is rotatable about the main shaft for winding the fishing line on the spool. An oscillating slider is coupled to the second end of the main shaft. The slider has a side face with a recess therein. The recess has a first cam surface and a second cam surface. An oscillating member is rotatable about an axis substantially perpendicular to a longitudinal axis of the main shaft. The oscillating member has a cam assembly operatively connected to the slider. The cam assembly has a first cam member for engaging the first cam surface and a second cam member for engaging the second cam surface for oscillating the drive member and spool by rotation of the oscillating member.

The objects and advantages of the invention are further attained by providing a fishing reel comprising a housing having a forward end and a back end, and a main shaft mounted for limited axial movement in the housing. The main shaft has a longitudinal axis with a first axial end and second axial end. The first end of the main shaft extends from the forward end of the housing. The main shaft is non-rotatable with respect to the housing. A drag assembly is coupled to the first end of the main shaft. A line spool is coupled to the drag assembly for receiving a fishing line. A rotor assembly is rotatably mounted on the main shaft for winding the fishing line on the spool. An oscillating slider is coupled to the second end of the main shaft. The slider has a side face with a first recess having a substantially figure-8 configuration. The recess has a first substantially continuous cam surface. An oscillating member is rotatably mounted in the housing about an axis substantially perpendicular to the axis of the main shaft. The oscillating member has a cam assembly operatively connected to the slider and is received in the recess for oscillating the slider and main shaft along the longitudinal axis upon rotation of the oscillating member.

The objects and advantages of the invention are also attained by providing a fishing reel comprising a housing having a forward end and a back end and a main shaft having a longitudinal axis mounted in the housing for limited axial movement. The spool has a first and a second axial end. A drag assembly is coupled to the first axial end of the main shaft. A line spool is coupled to the drag assembly. A rotor assembly is mounted in the housing for winding the fishing line onto the spool. A drive member is coupled to the second end of the main shaft. The drive member has a side face with a recess. The recess has a substantially continuous surface defining a first cam surface. An oscillating member is rotatably mounted in the housing about an axis substantially perpendicular to the axis of the main shaft. The oscillating member has a cam assembly fixed to the oscillating member and operatively coupled to the first recess in the drive member, wherein the recess in the drive member has a shape to cause the main shaft to reciprocate along the axis of the main shaft at a substantially constant velocity upon rotation of the oscillating member.

The objects, advantages and salient features of the invention will become apparent to one skilled in the art in view of the following detailed description of the invention and the annexed drawings which form a part of this original disclosure.

BRIEF DESCRIPTION OF THE DRAWINGS

The following is a brief description of the drawings in which.

DETAILED DESCRIPTION OF THE INVENTION

Figure 1:
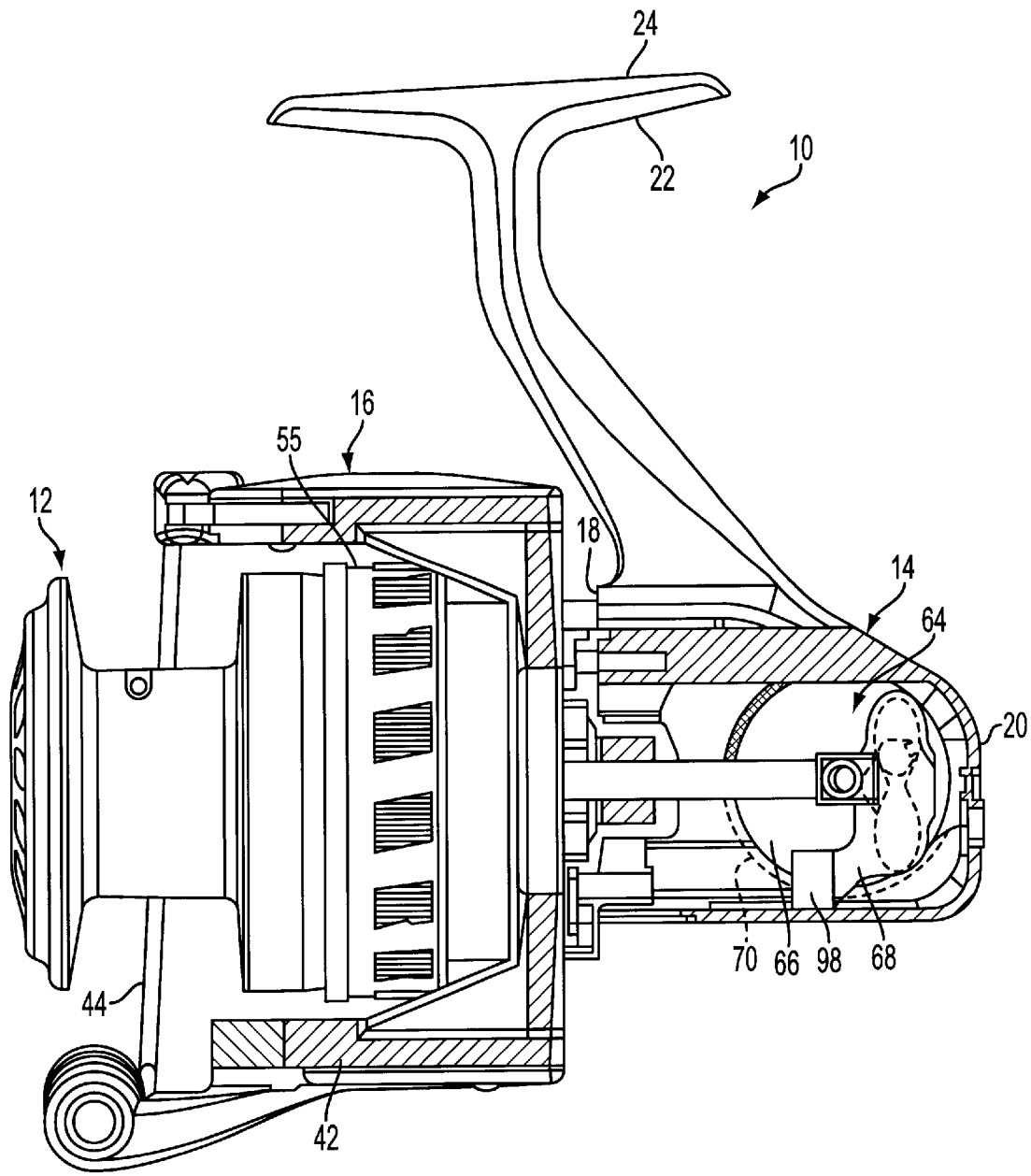
FIG. 1 is a side elevational view of the fishing reel in partial cross-section showing the spool, main shaft and oscillating assembly for oscillating the spool.

The present invention is directed to a fishing reel 10 having a spool 12 where the spool oscillates along an axis so that a fishing line is wound substantially uniformly onto the spool 12. More particularly, the invention is directed to a fishing reel 10 where the spool 12 oscillates along its axis at a substantially constant speed throughout the axial movement of the spool 12 with respect to the winding speed of a fishing line onto spool 12.

Referring to the drawings, fishing reel 10 includes a housing 14 supporting spool 12 and a rotor 16. Housing 14 includes a front open end 18 and a closed back end 20. A foot 22 extends from one side of housing 14 and includes a curved bottom portion 24 for mounting to a fishing rod in a conventional manner.

Figure 2:
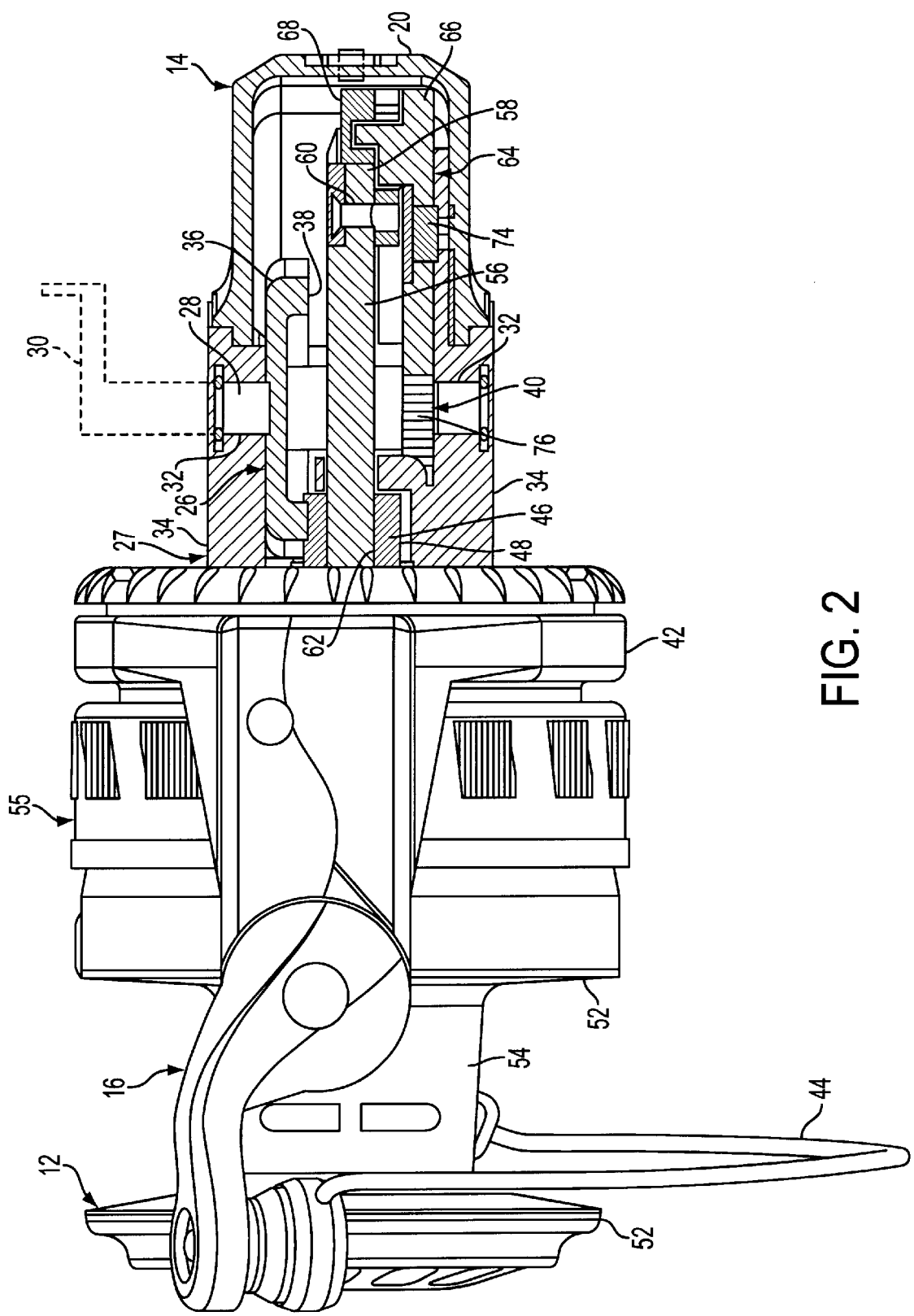
FIG. 2 is a top view of the fishing reel of FIG. 1 showing the housing and the oscillating assembly in partial cross-section.

Housing 14 supports a drive assembly 26. As shown in FIG. 2, drive assembly 26 includes a support 27, a drive shaft 28, and a crank handle 30 coupled to shaft 28 for rotating shaft 28. Shaft 28 extends through support 27 and is supported by bearing surfaces 32 on opposite side walls 34 of support 27. A first drive gear 36 is coupled to shaft 28 for rotating about a common axis with shaft 28. Drive gear 36 includes axially facing teeth 38 as shown in FIG. 2. A second drive gear 40 spaced from first drive gear 36 is also coupled to shaft 28 for rotation with shaft 28. In the embodiment illustrated, drive gear 26 is a face gear positioned adjacent a first side wall 34 with teeth 38 facing inwardly with respect to housing 14. Second drive gear 40 is integrally formed with or press-fitted onto shaft 28 and positioned adjacent a side wall 34 opposite first drive gear 36. Second drive gear 40 has a smaller diameter than drive gear 36 and includes gear teeth 76 that face radially outward.

Figure 3:
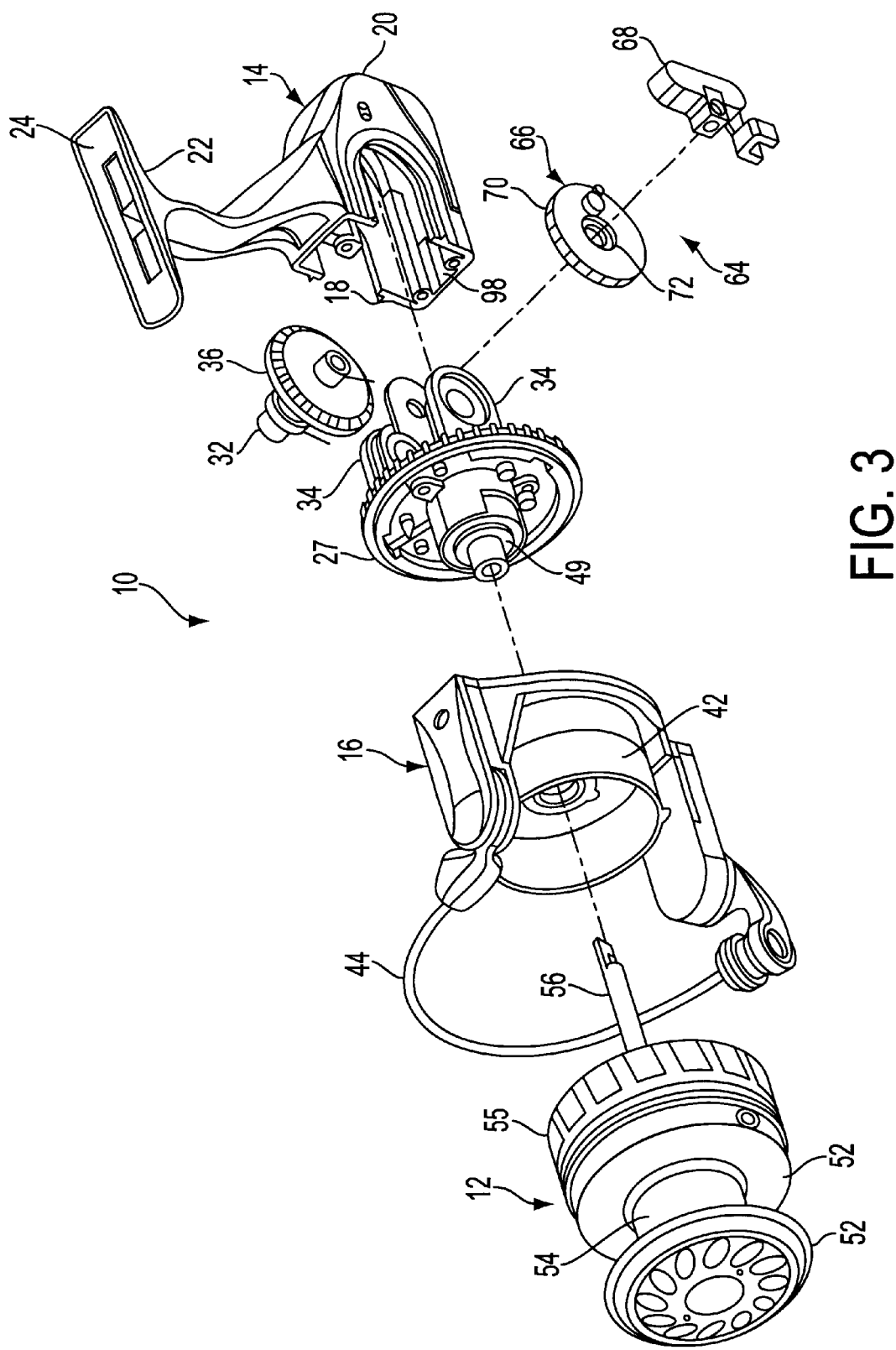
FIG. 3 is an exploded perspective view of the fishing reel of FIG. 1.

Rotor 16 is coupled to support 27 and housing 14 for rotating about a central axis that is substantially perpendicular to an axis of rotation of shaft 28. Rotor 16 includes a housing 42 and a bail 44 as in known fixed spool-type reels. A gear 46 is coupled to housing 42 of rotor 16 and is oriented about the axis of rotation of rotor 16. Gear 46 is provided with external teeth 48 that mesh with axially facing teeth 38 of first drive gear 36. Gear 46 is mounted for rotation on a main shaft 56. Main shaft 56 extends through an axial bore provided in gear 46. Rotating crank handle 30 rotates first drive gear 36 and gear 46 to rotate rotor 16 about its axis. A suitable anti-reverse mechanism 49 is preferably provided to limit the direction of rotation of rotor 16 as known in the art. The anti-reverse mechanism can be mounted in the rotor 16 as shown in FIG. 3 or on shaft 28 according to standard practices.

Rotor 16 operates in a similar manner to a standard rotor and housing assembly as known in the art. Rotor 16 can have a structure substantially the same as the rotor disclosed in U.S. Pat. Nos. 4,927,094 and 5,605,299 to Henriksson, which are hereby incorporated by reference in their entirety. Another example of a rotor and drive gear is disclosed in U.S. Pat. No. 6,000,653 to Okada, which is hereby incorporated by reference in its entirety.

Spool 12 includes opposing flanges 52 and a main body portion 54. Spool 12 is coupled to a drag assembly 55, which is coupled to an outer axial first end of main shaft 56. Drag assembly 55 typically includes a plurality of stacked washers and an adjustable pressure plate to adjust the drag force between spool 12 and main shaft 56 as known in the art. An example of a suitable drag assembly is disclosed in U.S. Pat. No. 5,605,299, which is hereby incorporated by reference in its entirety. Main shaft 56 as shown in FIG. 2 has a longitudinal axis having a second end 58 with an aperture 60 for receiving a screw. Main shaft 56 is mounted in housing 14 and is coaxially aligned with rotor 16. As shown in FIG. 2, gear 46 of rotor 16 includes a central passage 62. Main shaft 56 extends through passage 62 of gear 46 so that gear 46 rotates on main shaft 56.

Second end 58 of main shaft 56 is coupled to an oscillating assembly 64 for oscillating main shaft 56 and spool 12 along the axis of main shaft 56. Oscillating assembly 64 includes a rotatably mounted oscillating member 66 and an oscillating slider 68.

Oscillating member 66 in the illustrated embodiment is an oscillating gear having external teeth 70. Oscillating member 66 includes a central opening 72 for receiving a pinion 74 as shown in FIG. 2. Pinion 74 is mounted in an aperture or recess in housing 14 so that oscillating member 66 rotates about a fixed axis that is substantially parallel to the axis of rotation of shaft 28 and perpendicular to the axis of main shaft 56. External teeth 70 of oscillating member 66 mesh with external teeth 76 of second drive gear 40. As shown in FIG. 2, rotating crank handle 30 rotates shaft 28 and simultaneously rotates drive gear 36 for rotating rotor 16 around main shaft 56 and rotates drive gear 40 for rotating oscillating member 66 about its axis. In this manner, rotor 16 rotates at a speed that is a constant ratio of the rotational speed of oscillating member 66.

Figure 4:
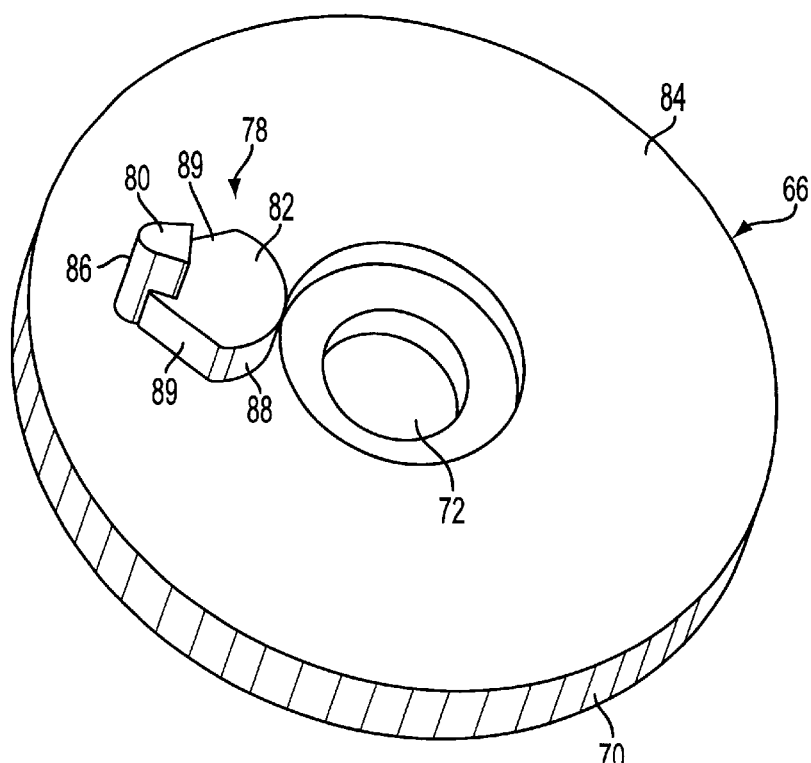
FIG. 4 is a perspective view of the oscillating drive member showing the two cam surfaces of the oscillating assembly of the embodiment of FIG. 1.
Figures 5, 6:
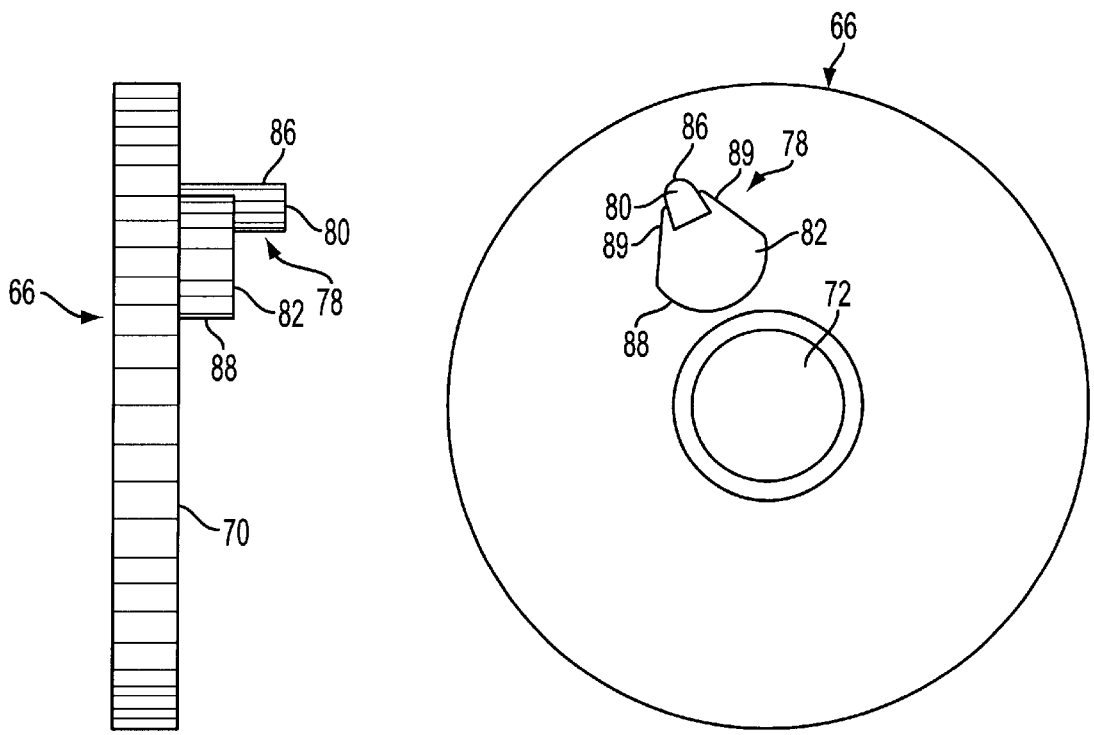
FIG. 5 is a side elevational view of the oscillating member of FIG. 4.
FIG. 6 is a top view of the oscillating member of FIG. 4.

As shown in FIGS. 4–6, oscillating member 66 includes an eccentrically mounted cam assembly 78. Cam assembly 78 includes a first cam member 80 and a second cam 82. In the embodiment illustrated, first cam member 80 is integrally formed with second cam member 82 although the cam members can be separate members that are either joined together or spaced apart. First cam member 80 extends outwardly from a side face 84 of oscillating member 66 a first distance. First cam member 80 in the embodiment illustrated has a generally tear drop shape forming an outwardly facing camming face 86. Camming face 86 faces radially outward with respect to an axis of rotation of oscillating member 66.

Second cam member 82 also has a generally tear drop shape and extends outwardly from side face 84 of oscillating member 66 a second distance. Second cam member 82 has a camming surface 88 facing radially inward with respect to an axis of rotation of oscillating member 66. First cam member 80 and second cam member 82 together form cam assembly 78 and cooperate together with oscillating assembly 64 as discussed hereinafter in greater detail. In the embodiment illustrated, first cam member 80 has a length extending from side face 84 that is greater than the length of second cam member 82. In one embodiment of the invention, first cam member 80 has a length about twice the length of second cam member 82.

As shown in FIG. 4, camming surface 88 of second cam member 82 has a generally arcuate shape and a surface area greater than the surface area of cam surface 86 of first cam member 80. The tear drop shape of second cam member 82 has side walls 89 that converge toward first cam member 80 so that cam assembly 78 has an overall tear drop shape.

Figures 7, 8:
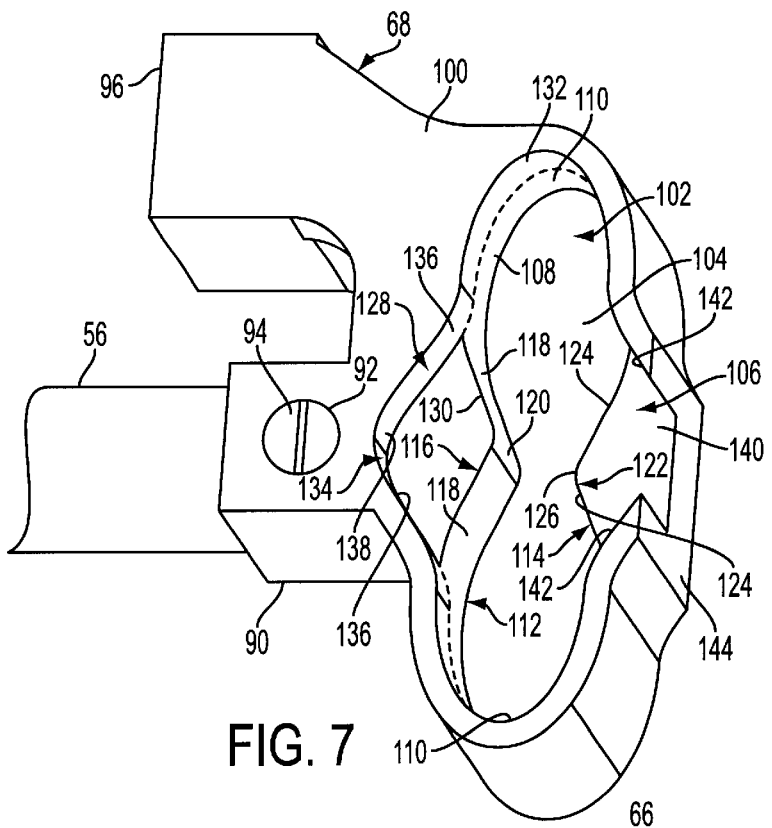
FIG. 7 is a perspective view of the oscillating slider of the oscillating assembly of FIG. 1.
FIG. 8 is a side elevational view of the oscillating drive member and oscillating slide member shown at the end of each stroke.

Referring to FIG. 7, oscillating slider 68 includes a base 90 having an axial opening for receiving main shaft 56. An opening 92 extends through a side of base 90 for receiving a screw 94 or other fastener for coupling slider 68 to main shaft 56. A stabilizing leg 96 extends from one end of slider 68. Stabilizing leg 96 is dimensioned to engage a track 98 in housing 14 as shown in FIG. 3 for guiding slider 68 along an axis parallel to the axis of main shaft 56. Stabilizing leg 96 has a length and width for engaging track 98 to resist rotation of slider 68 and main shaft 56 around the axis of main shaft 56 caused by tension on a fishing line that is wound onto spool 12.

Slider 68 includes a side face 100 having a recess 102. Recess 102 is dimensioned to receive cam assembly 78. Recess 102 has a longitudinal dimension substantially perpendicular to the axis of main shaft 56 and a transverse dimension oriented in a plane parallel to the longitudinal axis of main shaft 56. Recess 102 is dimensioned so that rotation of oscillating member 66 and cam assembly 78 to produce an oscillating motion to slider 68, main shaft 56 and spool 12. Recess 102 and cam assembly 78 have a complementary shape so that rotation of oscillating member 66 produces an oscillating motion having a substantially uniform speed throughout the entire stroke of slider 68.

As shown in FIG. 7, recess 102 includes a first recessed area 104 and a second recessed area 106. First recessed area 104 has a longitudinal length extending substantially perpendicular to the axis of main shaft 56 and defines the longitudinal dimension of recess 102. First recessed area 104 has a width and a length to receive first cam member 80 to produce an oscillating motion to main shaft 56 upon rotation of oscillating member 66. In preferred embodiments, first recessed area 104 is substantially symmetrical about a longitudinal axis.

As shown in FIG. 7, first recessed area 104 has a continuous camming surface 108. In one embodiment of the invention, first recessed area 104 has a substantially figure-8 configuration as shown in FIG. 7. Camming surface 108 of first recessed area 104 has lobes defined by end surfaces 110 oriented at the longitudinal ends of recessed area 104, a forward surface 112 facing away from main shaft 56 toward the rear end of housing 14 and a rear surface 114 facing toward main shaft 56 in a forward direction with respect to housing 14. Forward surface 112 has a lobe or bulged portion 116 extending inwardly into first recessed area 104. As shown in FIG. 7, bulged portion 116 is aligned axially with main shaft 56 and includes inclined ramp portions 118 extending from end surfaces 110 to a peak 120. Rear surface 114 includes a similar lobe or bulged portion 122 extending toward bulged portion 112. Bulged portion 122 of rear surface 114 also includes ramp portions 124 extending from end surfaces 110 to a peak 126. Bulged portions 116 and 122 define the substantially figure-8 configuration of first recessed area 104. The spacing between peaks 120 and 126 is sufficient to allow first cam member 80 to slide between the peaks.

First cam member 80 continuously engages camming surface 108 of first recessed area 104 throughout rotation of oscillating member 66 and produces an oscillation movement of slider 68 and main shaft 56. First cam member 80 slides along camming surface 108 from an end surface 110 along ramp portion 118 to peak 120 to push slider 68 and main shaft 56 in a forward direction with respect to housing 14. In a similar manner, continued rotation of oscillating member 66 causes first cam member 80 to slide along cam surface 104 from an end surface 110 along ramp portion 124 to peak 126 to push slider 68 and main shaft 56 toward a back end of housing 14.

Second recessed area 106 includes a camming surface 128 that is spaced from camming surface 104 so that the camming surfaces 104 and 128 are side-by-side. As shown in FIG. 7, first recessed area 104 has a depth greater than second recessed area 106. A stepped portion 130 separates camming surface 108 from camming surface 128. Camming surface 128 includes a longitudinally oriented end surface 132 that coincides with end surfaces 110 of first recessed area 104 as shown in FIG. 7. Camming surface 128 also includes a recessed area 134 extending in a forward direction with respect to main shaft 56 and forward surface 112 of camming surface 108. Recessed portion 134 includes ramp portions 136 converging toward a trough 138 that is substantially aligned with peak 120 of camming surface 108.

Second recessed area 106 also includes a second recessed portion 140 extending in a rear direction from rear surface 114 of first camming surface 108. Second recessed portion 140 includes ramps 142 extending away from rear surface 114. In the embodiment illustrated in FIG. 7, the rear end of slider 68 is truncated to form an end surface 144 to limit the overall axial length of slider 68. As discussed hereinafter in greater detail, the truncated end 144 of slider 68 allows slider 68 to reciprocate within housing 14 without interfering with the rear wall of housing 14. This allows the overall length of housing 14 to be shorter than would otherwise be required. In further embodiments, slider 68 can have a continuous second recessed portion 140 that is substantially symmetrical with the first recessed portion 134.

Reel 10 is assembled as shown in FIGS. 1–3 with cam assembly 78 operatively coupled with slider 68. As shown, shaft 28 is mounted in housing 14 with gear 36 coupled to gear 46 of rotor and gear 40 coupled to oscillating member 66. Cam assembly 78 is inserted into recess 122 of oscillating slider 68. FIGS. 8–12 depict the oscillating movement of slider 68 upon rotation of oscillating member 66. As shown in FIG. 8, first cam member 80 is received in first recessed area 104 and second cam member 82 is received in second recessed area 106. FIG. 8 illustrates the slider 68 in the forward and back position with respect to housing 14. In the forward position shown in the left hand side of FIG. 8, first cam member 80 is positioned between the opposing peaks 120 and 126 with the camming surface 80 contacting forward cam surface 112 and second cam member 82 positioned in recessed portion 140. In the back position shown in the right hand side of FIG. 8, cam surface 86 of first cam 80 contacts peak 126 and second cam 82 positioned in recessed portion 134 of second recessed area 106. In the positions of oscillating member 66 shown in FIG. 8, first cam member 80 is positioned between peaks 120 and 126 to prevent movement of slider 68 in an axial direction with respect to an axis of main shaft 56.

Figure 9:
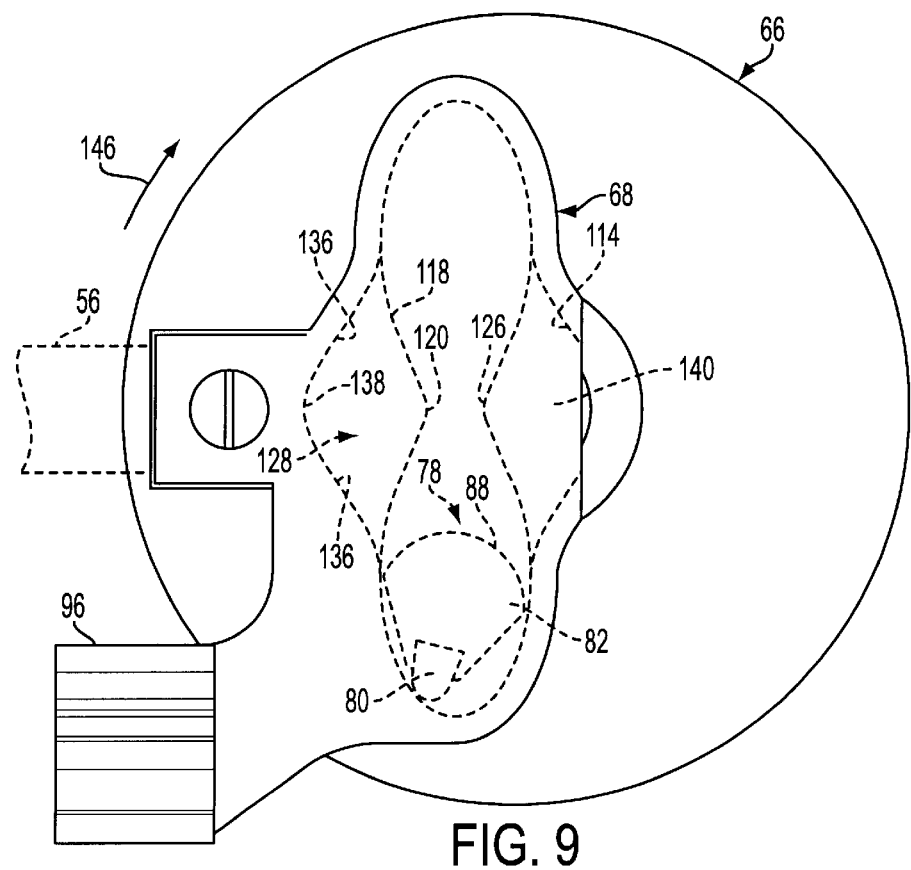
FIG. 9 is a side view of the oscillating drive member and slider showing the cam in a first position.
Figure 10:
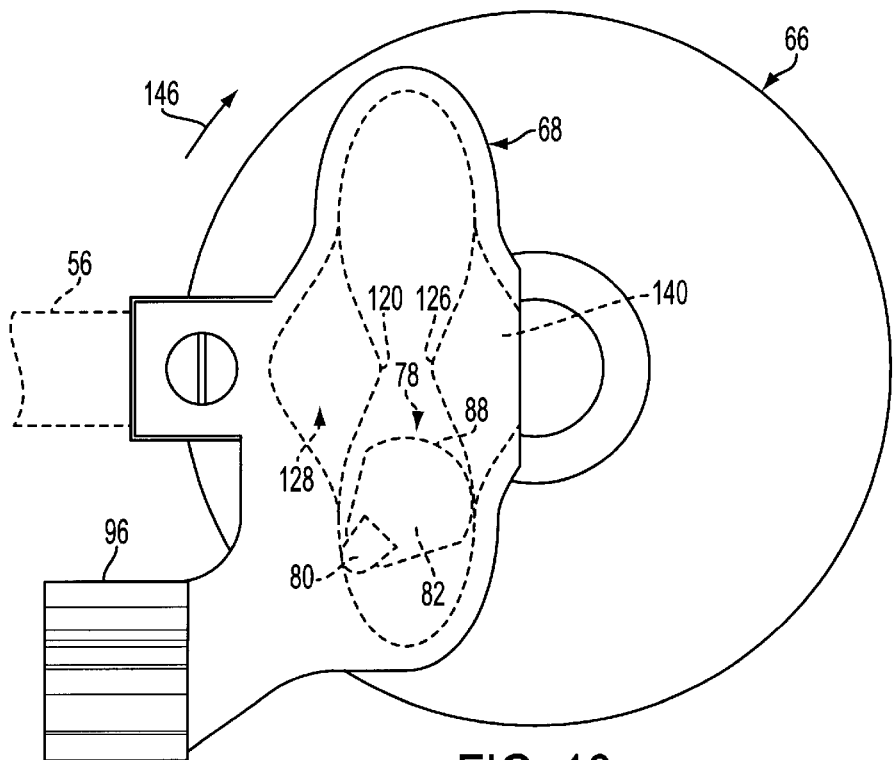
FIG. 10 is a side view of the oscillating member and slider member showing the cam in a second position after partial rotation of the oscillating member.
Figure 11:
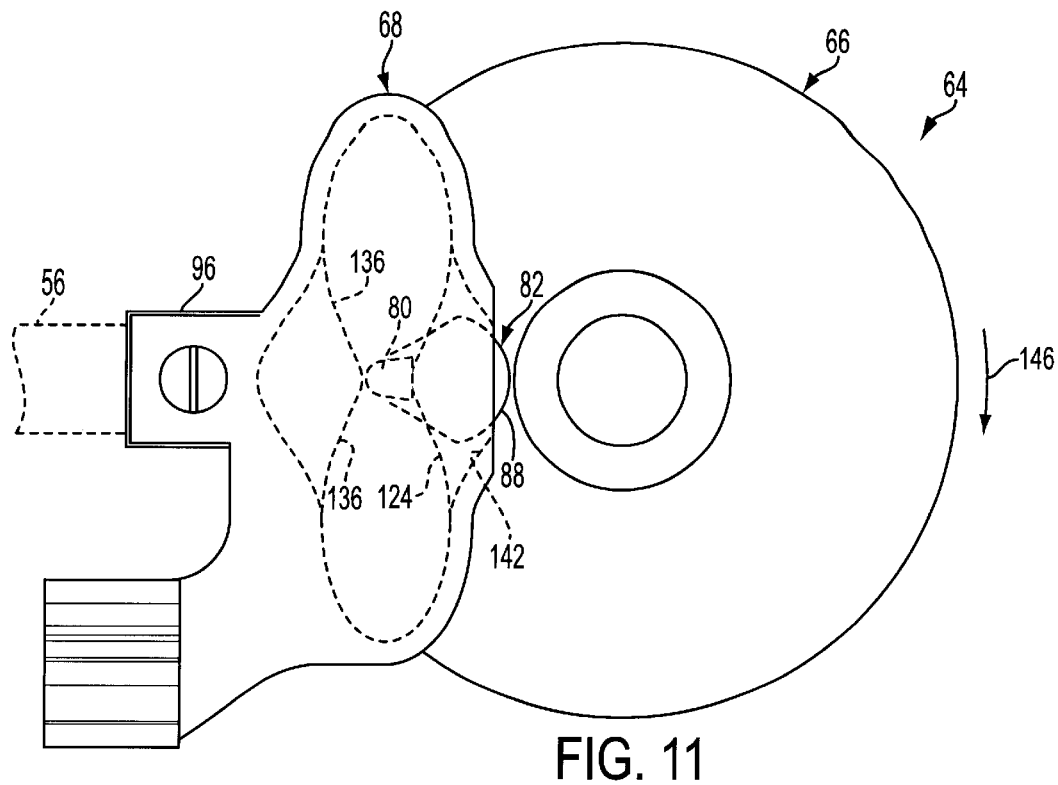
FIG. 11 is a side view of the oscillating drive member and slide member showing the cam in a third position.
Figure 12:
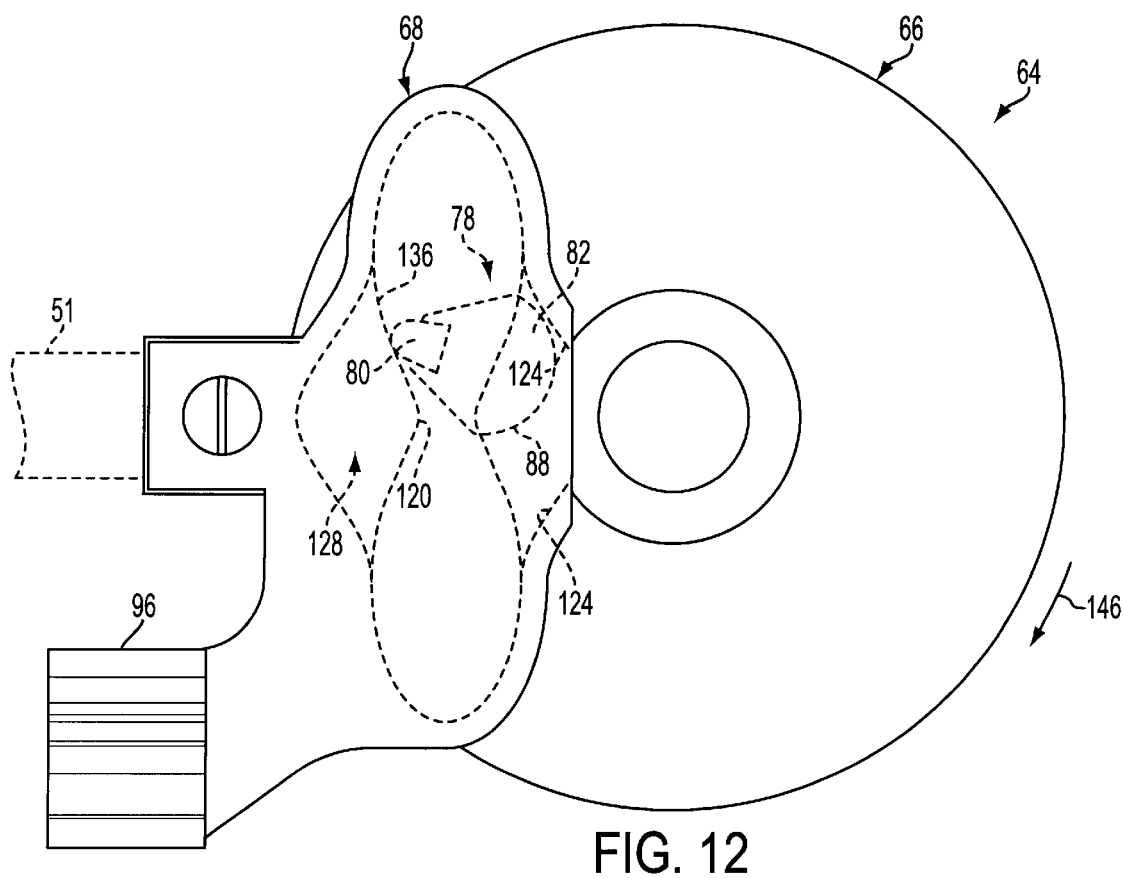
FIG. 12 is a side view showing the oscillating drive member and slide member in a fourth position.

As shown in FIG. 9, cam assembly 78 is received within recessed area 102 so that cam surface 86 of first cam member 80 is always in contact with camming surface 108. Second cam member 82 contacts camming surface 128 of second recess 106 to limit axial movement of slider 68 with respect to cam assembly 78. As shown in FIG. 9, first cam member 80 contacts cam surface 108 along an end surface 110 while second cam member 82 contacts second cam surface 128. Second cam member 82 has a width to engage the opposing faces of second cam surface 128 to prevent axial movement of slider with respect to cam assembly 78. As oscillating member 66 rotates in the direction of arrow 146, first cam member 80 slides along the forward surface 112 and second cam member 82 slides along rear cam surface 114 as shown in FIG. 10. Oscillating member 66 continues rotation to the position of FIG. 11 where first cam member 80 is positioned between peaks 120 and 126. In preferred embodiments, first cam member 80 is dimensioned to be able to pass between peaks 120 and 126 and provide limited movement of slider 68 with respect to first cam member 80. Oscillating member continues rotating to the position shown in FIG. 12, with second cam member 82 contacting rear surface 114 and moving slider 68 toward the rear end of housing 14. At this position, first cam member 80 contacts forward surface 112 to limit axial movement of slider 68 with respect to cam assembly 78.

Oscillating assembly 164 is able to oscillate main shaft 56 and spool 12 at a substantially uniform speed throughout rotation of oscillating member 66. Although the actual speed of the axial movement of spindle 56 is directly proportional to the rotational speed of oscillating member 66, the linear movement of main shaft 56 is constant for a rotational speed of oscillation member 66. Oscillating member 66 and rotor 16 are coupled to and drive by shaft 28 so that the ratio of the speed of oscillating member 66 and rotor 16 is constant. The prior oscillating assemblies that include a straight slot produce an oscillating movement where the speed of the spool in an axial direction decreases as the spool approaches the end of the stroke. The figure-8 configuration of the recessed area in slider 68 produces a substantially uniform speed in the axial direction of main shaft 56 by rotation of oscillating member 66 at a constant speed. As first cam member 80 slides along forward camming surface 1 12 and approaches ramp portion 118, slider 68 is moved in the forward direction further than if recessed area 102 of slider 68 were a straight groove. It will be appreciated that the speed at the end of each stroke of slider 68 will depend on the angle of ramps 118 and 124 with respect to the longitudinal dimension of recess 102 and the spacing of cam surface 86 of first cam member 80 from the axis of rotation of oscillating member 66. Thus, the actual shape of first recessed area 104 and cam surface 108 depends on the shape of cam surface 86 from the axis of rotation of oscillating member.

While a single embodiment of the invention has been chosen to illustrate the invention, it will be understood by those skilled in the art that various modifications and changes can be made to the assembly without departing from the scope of the invention as defined in the appended claims.

What is claimed is:

1. A fishing reel, comprising:

a housing having a forward end and back end;

a main shaft mounted in said housing, said main shaft having a first axial end and second axial end;

a line spool coupled to said first end of said main shaft for receiving a fishing line, said main shaft being non-rotatable with respect to said housing;

a rotor assembly rotatably mounted in said housing and being rotatable about said main shaft for winding said fishing line on said spool;

an oscillating slider coupled to said second end of said main shaft, said slider having a side face with a recess therein, said recess having a first cam surface and a second cam surface;

an oscillating member rotatable about an axis substantially perpendicular to a longitudinal axis of said main shaft, said oscillating member having a cam assembly operatively connected to said slider, said cam assembly having a first cam member for engaging said first cam surface and a second cam member for engaging said second cam surface for oscillating said drive member and spool by rotation of said oscillating member.

2. The fishing reel of claim 1, wherein said first cam surface of said recess in said drive member has a figure-8 shape.

3. The fishing reel of claim 2, wherein said first recess is substantially symmetrical.

4. The fishing reel of claim 1, wherein said recess has a step portion defining said first cam surface and said second cam surface.

5. The fishing reel of claim 4, wherein a portion of said first cam surface coincides with a portion of said second cam surface.

6. The fishing reel of claim 1, wherein said first cam surface has a length substantially the same as said second cam surface.

7. The fishing reel of claim 1, wherein said first cam surface has a first portion and a second portion, and wherein said second cam surface has a first portion and a second portion, said first portion of said first cam surface coinciding with said first portion of said second cam surface, and said second portion of said second cam surface being spaced outwardly from said second portion of said first cam surface.

8. The fishing reel of claim 7, wherein said first cam surface has a generally figure-8 configuration with outer end surfaces and a middle surface, said outer end surfaces defining said first portion of said first cam surface and said middle surfaces defining said second portion of said first cam surface.

9. The fishing reel of claim 1, wherein said first and second cam members are radially spaced from an axis of rotation of said oscillating member.

10. The fishing reel of claim 9, wherein said first cam member has a camming surface and said second cam member has a camming surface, and wherein said camming surface of said first cam member is spaced radially outward from said camming surface of said second cam member.

11. The fishing reel of claim 10, wherein said camming surface of said first cam member faces in a generally radially outward direction with respect to a center axis of said oscillating gear, and said camming surface of said second cam member faces radially inward with respect to said center axis.

12. The fishing reel of claim 1, wherein said first cam member has a first length extending from oscillating gear to engage said first cam surface of said recess in said drive member, and wherein said second cam member has a second length extending from said oscillating gear to engage said second cam surface in said recess, and said first length being greater than said second length.

13. The fishing reel of claim 1, wherein said second cam member engages said second cam surface to maintain said first cam member in substantially continuous contact with said first cam surface.

14. The fishing reel of claim 13, wherein said second cam member contacts said second cam surface to reduce play between said first cam member and said first cam surface in an axial direction with respect to said axis of said main shaft.

15. A fishing reel comprising:

a housing having a forward end and a back end;

a main shaft mounted for limited axial movement in said housing, said main shaft having a longitudinal axis with a first axial end and second axial end, said first end of said main shaft extending from said forward end of said housing, said main shaft being non-rotatable with respect to said housing;

a drag assembly coupled to said first end of said main shaft;

a line spool coupled to said drag assembly for receiving a fishing line;

a rotor assembly rotatably mounted on said main shaft for winding said fishing line on said spool;

a oscillating slider coupled to said second end of said main shaft, said slider having a side face with a first recess having a substantially figure-8 configuration, said recess having a first substantially continuous cam surface;

an oscillating member rotatably mounted in said housing about an axis substantially perpendicular to said axis of said main shaft, said oscillating member having a cam assembly operatively connected to said slider and being received in said recess for oscillating said slider and main shaft along said longitudinal axis upon rotation of said oscillating member.

16. The fishing reel of claim 15, wherein said oscillating member is a gear.

17. The fishing reel of claim 15, further comprising a crank handle operatively connected to said oscillating member.

18. The fishing reel of claim 17, wherein said rotor assembly includes a gear rotatably mounted on said main shaft, and wherein said crank handle is operatively connected to said gear for simultaneously rotating said rotor assembly and oscillating member.

19. The fishing reel of claim 15, wherein said recess has a longitudinal dimension oriented in a plane substantially perpendicular to said axis of said main shaft.

20. The fishing reel of claim 15, wherein said first recess is substantially symmetrical.

21. The fishing reel of claim 15, wherein said drive member includes a second recess having an inner face defining a second cam surface.

22. The fishing reel of claim 21, wherein said second cam surface is spaced axially from said first cam surface.

23. The fishing reel of claim 21, wherein said recess includes a step portion defining said first cam surface and said second cam surface.

24. The fishing reel of claim 23, wherein said first recess comprises two first lobes oriented in a first plane, and wherein said second recess comprises two second lobes oriented along a second plane that is substantially perpendicular to said first plane.

25. The fishing reel of claim 24, wherein said cam assembly includes a first cam member having a camming surface, and a second cam member having a camming surface, and wherein said camming surface of said first cam member is spaced radially outward from said camming surface of said second cam member.

26. The fishing reel of claim 25, wherein said camming surface of said first cam member faces in a generally radially outward direction with respect to a center axis of said oscillating member, and said camming surface of said second cam member faces radially inward with respect to said center axis.

27. The fishing reel of claim 15, wherein said first cam member has a first length extending from said oscillating gear to engage said first cam surface of said recess in said drive member, and wherein said second cam member has a second length extending from said oscillating gear to engage said second cam surface in said recess, and said first length being greater than said second length.

28. The fishing reel of claim 27, wherein said second cam member engages said second cam surface to maintain said first cam member in substantially continuous contact with said first cam surface.

29. The fishing reel of claim 28, wherein said second cam member contacts said second cam surface to reduce play between said first cam member and said first cam surface in an axial direction with respect to said axis of said main shaft.

30. A fishing reel comprising:
a housing having a forward end and a back end;
a main shaft having a longitudinal axis mounted in said housing for limited axial movement, said shaft having a first and a second axial end;
a drag assembly coupled to said first axial end of said main shaft;
a fishing line spool coupled to said drag assembly;
a rotor assembly mounted in said housing for winding said fishing line onto said spool;
a drive member coupled to said second end of said main shaft, said drive member having a side face with a recess, said recess having a substantially continuous surface defining a first cam surface;
an oscillating member rotatably mounted in said housing about an axis substantially perpendicular to said axis of said main shaft, said oscillating member having a cam assembly fixed to said oscillating member in a fixed location on said oscillating member, said cam assembly having a first cam member operatively engaging said first cam surface in said drive member and a second cam member operatively engaging said recess to maintain said first cam member in contact with said first cam surface, wherein said recess in said drive member has a shape to cause said main shaft to reciprocate along said axis of said main shaft at a substantially constant velocity upon rotation of said oscillating member.

31. The fishing reel of claim 30, wherein said recess includes a second cam surface, and wherein said first cam member operatively engages said first cam surface and said second cam member operatively engages said second cam surface.

32. The finishing reel of claim 31, wherein said first cam surface has a substantially figure-8 configuration, and said second cam member engages said second cam surface to maintain said first cam member in substantially continuous contact with said first cam surface throughout rotation of said oscillating member.

33. A fishing reel comprising:
a housing having a forward end and a back end;
a main shaft having a longitudinal axis mounted in said housing for limited axial movement, said shaft having a first and a second axial end;
a fishing line spool coupled to said first axial end of said main shaft;
a rotor assembly mounted in said housing for winding said fishing line onto said spool;
a drive member coupled to said second end of said main shaft, said drive member having a recess, with a substantially continuous first cam surface;
an oscillating member rotatably mounted in said housing about an axis substantially perpendicular to said axis of said main shaft, a cam assembly fixed to said oscillating member for rotating about said axis of said oscillating member in a path having a uniform distance from said axis of said oscillating member, said cam assembly having a first cam member operatively coupled to said first cam surface in said drive member and a second cam member operatively engaging said recess to maintain the first cam member in contact with said first cam surface, wherein said recess in said drive member has a shape to cause said main shaft to reciprocate along said axis of said main shaft at a substantially constant velocity upon rotation of said oscillating member.

34. The fishing reel of claim 33, wherein said recess includes a second cam surface, and wherein said second cam member operatively engages said second cam surface.

35. The fishing reel of claim 34, wherein said first cam surface has a substantially figure-8 configuration.

* * * * *